(12) United States Patent
Niemeyer

(10) Patent No.: US 11,684,991 B2
(45) Date of Patent: Jun. 27, 2023

(54) METHODS AND APPARATUS FOR REPAIRING A TUBULAR STRUCTURE

(71) Applicant: CANDU ENERGY INC., Mississauga (CA)

(72) Inventor: Frederik Geert Niemeyer, Grimsby (CA)

(73) Assignee: CANDU ENERGY INC., Mississauga (CA)

( * ) Notice: Subject to any disclaimer, the term of this patent is extended or adjusted under 35 U.S.C. 154(b) by 452 days.

(21) Appl. No.: 16/765,736

(22) PCT Filed: Nov. 28, 2018

(86) PCT No.: PCT/CA2018/051513
§ 371 (c)(1),
(2) Date: May 20, 2020

(87) PCT Pub. No.: WO2019/104427
PCT Pub. Date: Jun. 6, 2019

(65) Prior Publication Data
US 2020/0290145 A1 Sep. 17, 2020

Related U.S. Application Data

(60) Provisional application No. 62/591,755, filed on Nov. 28, 2017.

(51) Int. Cl.
*B23K 9/173* (2006.01)
*B23K 9/04* (2006.01)
(Continued)

(52) U.S. Cl.
CPC ............ *B23K 9/173* (2013.01); *B23K 9/04* (2013.01); *B23K 9/124* (2013.01); *B23K 9/326* (2013.01);
(Continued)

(58) Field of Classification Search
CPC .......... B23K 9/04; B23K 9/124; B23K 9/173; B23K 9/326; B23K 37/0276; B23K 2101/06; B23K 2103/05
See application file for complete search history.

(56) References Cited

U.S. PATENT DOCUMENTS 5,018,451 A 5/1991 Hapstack
6,044,769 A * 4/2000 Oka .................. F16L 55/34
104/138.2
(Continued)

FOREIGN PATENT DOCUMENTS

CN 101415517 A 4/2009
CN 103943157 A 7/2014
(Continued)

OTHER PUBLICATIONS

Supplementary European Search Report issued in European Application No. 18882682.0, dated Aug. 4, 2021.
(Continued)

*Primary Examiner* — Brian W Jennison
(74) *Attorney, Agent, or Firm* — Norton Rose Fulbright Canada LLP

(57) ABSTRACT

Apparatuses and methods for repairing a defect in a nuclear reactor are provided. The apparatus includes a body for insertion in a tubular structure, the body includes: an end effector having a weld torch operable to deposit weld material by forming molten weld droplets and depositing the weld droplets the tubular structure. A drive unit includes a brace for selectively anchoring against said tubular structure; at least one linear actuator for moving the apparatus relative to the brace; and a rotational actuator coupled to rotate the weld torch. The method includes inserting a repair apparatus into tubular structure of the nuclear reactor; moving the repair apparatus to a defect location; depositing a protective weld layer over the defect by sequentially depos- (Continued)

iting weld droplets atop a weld pool on the tubular structure, wherein the protective weld layer bonds to the tubular structure surrounding the defect.

15 Claims, 9 Drawing Sheets

(51) Int. Cl.
B23K 103/04 (2006.01)
B23K 101/06 (2006.01)
B23K 9/12 (2006.01)
B23K 9/32 (2006.01)
B23K 37/02 (2006.01)

(52) U.S. Cl.
CPC ...... B23K 37/0276 (2013.01); B23K 2101/06 (2018.08); B23K 2103/05 (2018.08)

(56) References Cited

U.S. PATENT DOCUMENTS

| | | | |
|---|---|---|---|
| 8,450,631 B2 | 5/2013 | Sato | |
| 2008/0075538 A1 | 3/2008 | Crane | |
| 2009/0166338 A1* | 7/2009 | Sato | B23K 37/0276 219/76.1 |
| 2009/0274553 A1* | 11/2009 | Bunting | F01D 25/246 29/402.07 |
| 2009/0274556 A1 | 11/2009 | Rose | |
| 2012/0027154 A1 | 2/2012 | Sugiura et al. | |
| 2014/0034714 A1* | 2/2014 | Gatlin | B23K 37/053 228/44.3 |

FOREIGN PATENT DOCUMENTS

| | | |
|---|---|---|
| CN | 104526249 A | 4/2015 |
| CN | 105478963 A | 4/2016 |

OTHER PUBLICATIONS

Office Action issued in Chinese Application No. 201880077127 X, dated Aug. 2, 2021.
Chinese National Intellectual Property AdminisliaLion (CNIPA), Office Action dated Apr. 1, 2022 for Chinese Patent Application No. 201880077127.X.
Chinese National Intellectual Property Administration (CNIPA), Office Action dated Aug. 11, 2022 for Chinese Patent Application No. 201880077127.X.

* cited by examiner

METHODS AND APPARATUS FOR REPAIRING A TUBULAR STRUCTURE

CROSS REFERENCE TO RELATED APPLICATIONS

This application claims all benefit including priority to U.S. Provisional Patent Application No. 62/591,755, filed on Nov. 28, 2017, which is incorporated by reference.

FIELD

The present invention generally relates to component maintenance and in particular to repairing tubular structures.

BACKGROUND

Nuclear reactors contain numerous components that are prone to wear and damage over the life of a reactor, which can have implications to safety, reliability, efficiency and regulatory requirements.

Unfortunately, many components are difficult to repair, for example, reactor components are irradiated during their operational life, which tends to cause structures to become brittle. Moreover, many structures have very thin walls. As a result, conventional repair techniques are likely to cause further damage. For example, introduction of heat and stress into a brittle irradiated component may cause cracks to form or propagate. Likewise, heating of a thin structure may cause defects such as cracking due to thermal stress or deformation.

Tight clearances between parts further complicates repair. In particular, in many cases, it may be difficult to deliver equipment to the location that requires repair, which may preclude in-situ repairs.

Due to the difficulty of repair, damaged components often need to be replaced at significant cost.

SUMMARY

In some embodiments, aspects of the present disclosure can be used for repairing a tubular structure from the inside of the structure. In some embodiments, the repair can include using weld metal build-up from the inside diameter of the structure.

According to an aspect of the invention, a method of repairing a defect in a tubular structure is provided. The method may comprise depositing a protective weld layer over the defect by sequentially depositing weld droplets atop a weld pool on said structure, wherein said protective weld layer bonds to said structure surrounding said defect, wherein sequentially depositing weld droplets comprises selectively moving a wire electrode of a weld torch between a retracted position in which the weld droplet is formed, and an advanced position in which the weld droplet is deposited on the structure.

In an embodiment of the method of repairing a defect in a tubular structure, the weld droplet is dropped on the structure.

In an embodiment of the method of repairing a defect in a tubular structure, depositing the protective weld layer over the defect is by gas metal arc welding (GMAW) or Plasma Transferred Arc Welding (PTAW). In some embodiments, depositing the protective weld layer includes Gas Tungsten Arc Welding (GTAW).

In an embodiment of the method of repairing a defect in a tubular structure, the tubular structure is part of a nuclear reactor.

In an embodiment of the method of repairing a defect in a tubular structure, the method comprises inserting a repair apparatus into the tubular structure; and moving the repair apparatus to a location of the defect.

In an embodiment of the method of repairing a defect in a tubular structure, the method comprises depositing a reinforcing layer atop said protective weld layer by gas metal arc welding (GMAW) or Plasma Transferred Arc Welding (PTAW) or Gas Tungsten Arc Welding (GTAW). In some embodiments, the depositing forms a structurally sound reinforcing layer atop the protective weld layer to repair the defect.

In another aspect, a method of moving a repair apparatus through a tubular structure is provided. The method comprises: positioning a first brace at an first angle with respect to an interior surface of the tubular structure; securely engaging the tubular structure with a first brace; moving the repair apparatus relative to the securely engaged first brace by expanding or contracting at least one linear actuator to advance the repair apparatus in a direction along the longitudinal axis of the tubular structure.

In an embodiment of the method of moving a repair apparatus through the tubular structure, moving the repair apparatus relative to the securely engaged first brace comprises moving a second brace relative to the first brace and to a second angle with respect to the interior surface of the tubular structure by expanding or contracting the at least one linear actuator to advance the repair apparatus in the direction.

In an embodiment of the method of moving a repair apparatus through the tubular structure comprises securely engaging the tubular structure with the second brace; disengaging the first brace from the tubular structure; and repositioning the first brace with respect to an interior surface of the tubular structure.

In an embodiment of the method of moving a repair apparatus through the tubular structure, the first and second brace are each a brace ring having a cross section smaller than a cross section of the tubular structure.

In an embodiment of the method of moving a repair apparatus through the tubular structure, at least three linear actuators are configured to move said first and second braces relative to one another for positioning a plane of each brace at a desired spatial relationship relative to each other.

In an embodiment of the method of moving a repair apparatus through the tubular structure, the method comprises positioning the first and second brace transverse to the longitudinal axis of the tubular structure.

In an embodiment of the method of moving a repair apparatus through the tubular structure, the method comprises rotating a base plate of the repair apparatus to position a weld torch connected to the base plate into circumferential alignment with a weld location.

In an embodiment of the method of moving a repair apparatus through the tubular structure, the method comprises depositing a weld droplet to the weld location.

In an embodiment of the method of moving a repair apparatus through the tubular structure, securely engaging said tubular structure with the first brace or second brace comprises expanding the first or second brace into contact with the tubular structure.

In an embodiment of the method of moving a repair apparatus through the tubular structure, the method comprises extending a locking actuator into contact with the tubular structure and locking said actuator to fix the longitudinal position of the repair apparatus with respect to the tubular structure.

In an embodiment of the method of moving a repair apparatus through the tubular structure, the method comprises rolling the repair apparatus on rollers rotatably connected to a support structure of said repair apparatus when the repair apparatus is advanced in the direction along the longitudinal axis of the tubular structure. In an embodiment, the rollers are biased into engagement with the tubular structure.

In an embodiment of the method of moving a repair apparatus through the tubular structure, the method comprises inserting the repair apparatus into the tubular structure, wherein the tubular structure is part of a nuclear reactor.

In another aspect, an apparatus for repairing a defect in a tubular structure is provided. The apparatus comprises: a body for insertion in a tubular structure of said tubular structure; an end effector mounted to said body, said end effector having a weld torch operable to deposit weld material on said tubular structure by forming molten weld droplets and depositing said weld droplets onto said tubular structure; a drive unit comprising: a first brace for selectively securely engaging the tubular structure to anchor the apparatus; at least one linear actuator for moving said apparatus relative to said first brace in a direction along the longitudinal axis of the tubular structure; and a rotational actuator coupled to said end effector for rotating said weld torch.

In an embodiment of the apparatus, the drive unit comprises a second brace for selectively securely engaging said tubular structure, the at least one linear actuator configured to move said first and second braces relative to one another in the longitudinal direction to move said apparatus in the direction. In an embodiment, the rings have a cross section smaller than a cross section of the tubular structure.

In an embodiment of the apparatus, the drive unit comprises at least three linear actuators configured to move said first and second braces relative to one another for positioning a plane of each brace at a desired spatial relationship relative to each other.

In an embodiment of the apparatus, the apparatus comprises a wire feed unit configured to selectively advance and retract a wire electrode of said weld torch. In an embodiment, the weld torch is configured to deposit said weld droplets onto said tubular structure by causing said weld droplets to fall by retracting said wire electrode away from said tubular structure. In another embodiment, the weld torch is configured to advance toward said tubular structure to deposit weld droplets on said tubular structure.

In an embodiment of the apparatus, the apparatus comprises a plurality of rollers structures connected to the end effector or the body, the roller structures comprising: a support structure; rollers rotatably connected to the support structure; and a plurality of biasing members each configured to bias at least one of the rollers into contact with the tubular structure.

In an embodiment of the apparatus, the apparatus comprises position sensors operable to report signals indicative of longitudinal and rotational position of the end effector and weld torch, and of the radial distance between weld torch and tubular structure.

In an embodiment of the apparatus, the apparatus comprises an extendable locking actuator for selectively contacting said tubular structure and anchor said locking actuator to fix the position of said end effector with respect to the tubular structure.

In an embodiment of the apparatus, the tubular structure is part of a nuclear reactor. In some embodiments, the methods and apparatuses can be used for repairing an irradiated tubular structure.

In some embodiments, the apparatuses and methods can be used to repair non-nuclear-related tubular structures.

DETAILED DESCRIPTION

Figure 1:
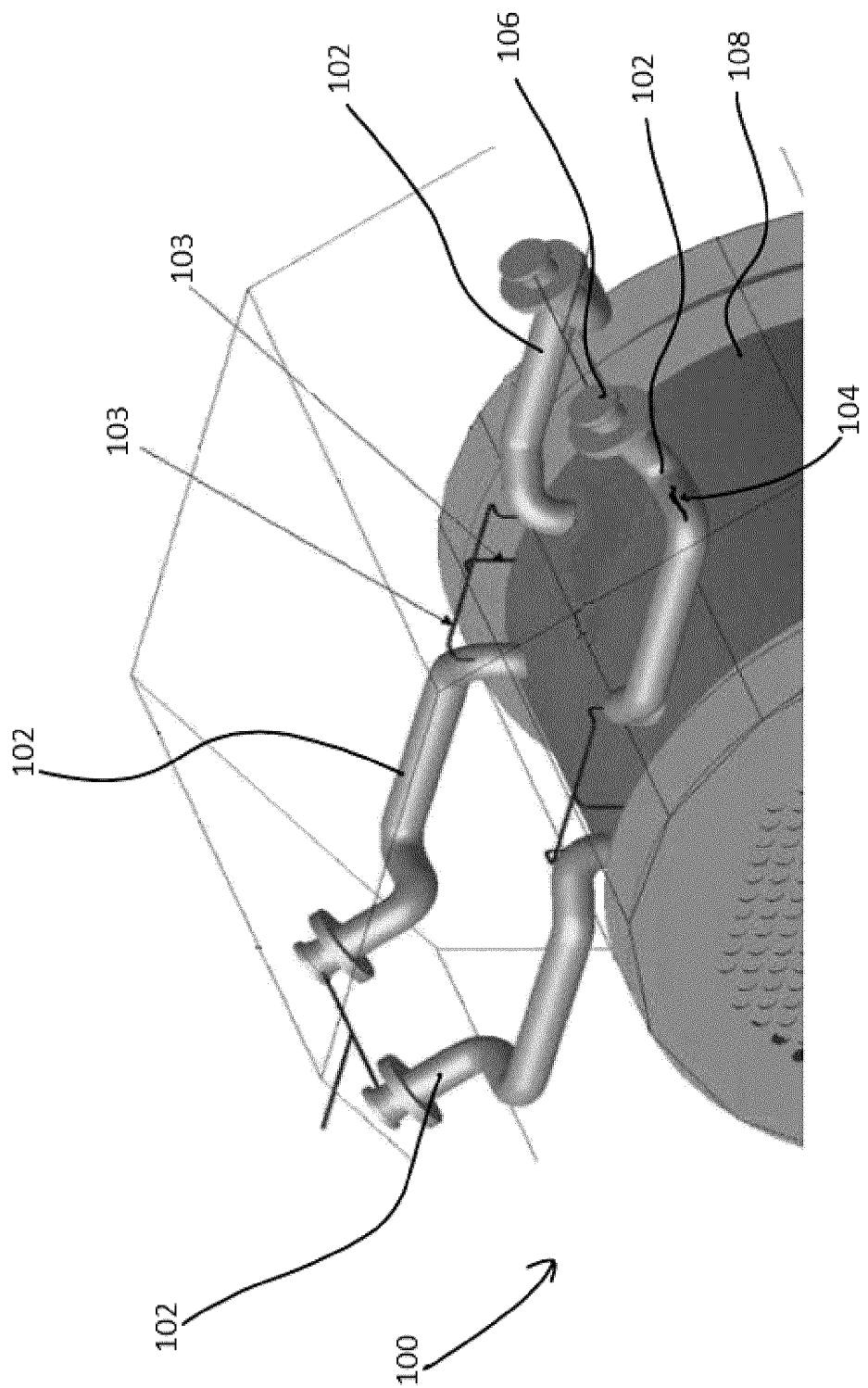
FIG. 1 is an isometric view of a portion of a nuclear reactor.

FIG. 1 shows a portion of a nuclear reactor 100. As depicted, reactor 100 is a CANDU™ reactor. Reactor 100 has a plurality of calandria relief ducts 102 and vent lines 103. Embodiments disclosed herein may be suitable for effecting repairs to calandria relief ducts 102, and detailed examples will be provided with reference to calandria relief ducts 102. However, it should be understood that apparatus and methods disclosed herein may also be suitable for repairing other components and structures of a nuclear reactor 100, or components and structures not associated with a nuclear reactor or the nuclear industry (e.g. piping in a petrochemical plant). Moreover, although the apparatus and methods disclosed herein are described with reference to a CANDU™ reactor, they may be suitable for repairing reactors of other types.

As depicted, calandria relief duct 102 has a defect, namely a crack 104. Crack 104 may form and propagate, due, for example to stress such as stress due to thermal cycling. Corrosion effects may worsen or accelerate the development of crack 104. As will be apparent, crack 104 defines a region of weakness in the wall of calandria relief duct 102, and also presents a risk of leakage.

Calandria relief duct 102 may be formed of stainless steel and may have walls approximately 0.375 inches thick. However, other components may be formed of other materials, such as plain (carbon) steel, aluminum or alloys thereof. Calandria relief duct 102 may be brittle as a result of irradiation during operation of reactor 100. Likewise, calandria relief duct 102 may have been subjected to radiation hardening.

Conventional repair techniques may be unsuitable for repairing calandria tube duct 102. For example, many such techniques introduce substantial quantities of heat into the work piece upon which they are formed. For example, welding using conventional Gas Metal Arc Welding (GMAW) may introduce sufficient heat to induce cracking or deformation due to thermal stress. Apparatus and methods disclosed herein are suitable for effecting a structurally sound mitigation of defect 104 by welding, while limiting heat input into the work piece (e.g. the calandria relief duct). More specifically, any type of welding technique may be suitable for use in connection the apparatus and methods of the present invention.

In some situations, direct physical access to a tubular structure may be limited or unavailable. For example, if the tubular structure traverses behind a wall or between other structures, it may be inaccessible from the outside. In other scenarios, the tubular structure may be in an area in which physical exposure should be minimized.

Structural repair of calandria relief duct 102 may rely on access to the duct interior proximate defect 104. The duct interior may be accessed through seal disks 106, which may be removed or broken. As used herein, the terms "proximal" and "distal" may be used to refer to positions along the length of a calandria relief duct 102. Specifically, "proximal" refers to locations close to seal disk 106 and "distal" refers to locations close to where calandria relief duct 102 meets calandria body 108 of reactor 100.

Figure 2:
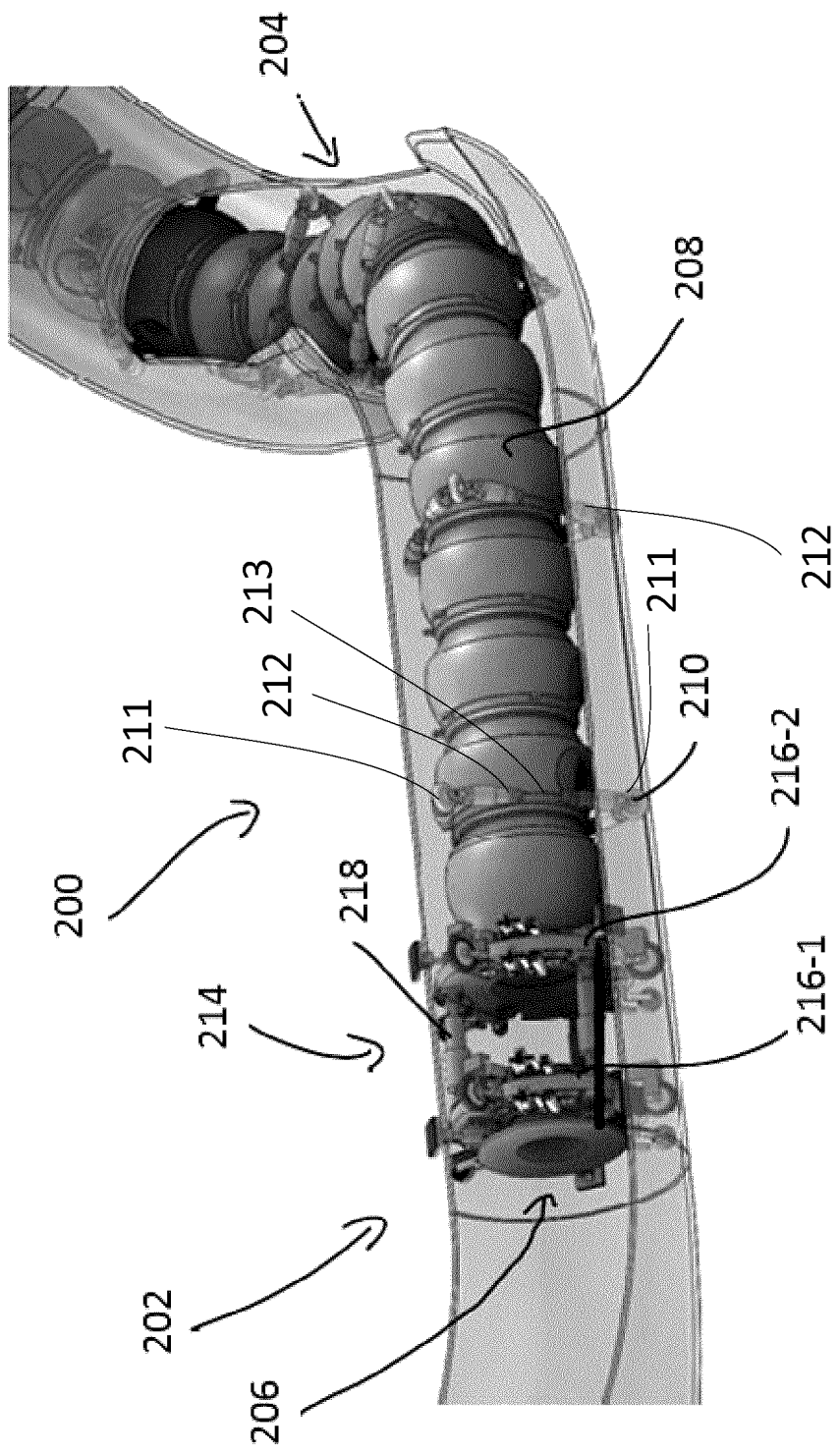
FIG. 2 is a partial cutaway view of a repair apparatus positioned within a calandria relief duct of the reactor of FIG. 1.

FIG. 2 depicts a repair apparatus 200 positioned within calandria relief duct 102 according to an embodiment. The wall of calandria relief duct 102 is partially cut away to show details of repair apparatus 200.

As illustrated in FIG. 2, repair apparatus 200 has a head section 202 and a tail section 204. Apparatus 200 may be inserted in calandria relief duct 102 with head section 202 at the distal end. An end effector 206 is mounted as part of head section 202. Tail section 204 extends behind head section 202 and may protrude from calandria relief duct 102.

Tail section 204 may comprise a plurality of segments 208 pivotably mounted to one another. Segments 208 may define an internal channel (not shown). One or more electrical power, control or data lines may be run through the channel for providing power, control and communication for end effector 206. In addition, consumables such as weld wire and gas may be routed through the channel Head section 202 and tail section 204 provide a base for transporting the element to effect welding and repair of the calandria relief duct 102. However, head section 202 and tail section 204 may be varied or substituted in embodiments. For example, tail section 204 may be omitted when head section 202 is provided with the elements to effect welding, e.g. an electrical power source, control lines and/or wireless communication devices, weld wire, and/or an inert gas supply.

A plurality of roller structures 210 may be mounted around head section 202 and tail section 204 of apparatus 200. Roller structures 210 are equipped with wheels for supporting apparatus 200 against calandria relief duct 102 such that apparatus 200 can be rolled and follow the path of the duct. Roller structures 210 also radially centre apparatus within calandria relief duct 102. In an example, a plurality of roller structures 210 each comprising rollers 211 rotatably connected to a support structure. The support structure 212 may be rotatably connected to head section 202 and/or tail section 204 of apparatus 200. The plurality of roller structures may be connected to end effector 206 and/or the body of apparatus 200, e.g. tail section 204. The plurality of roller structures are provided such that apparatus 200 may move within in interior of calandria relief duct 102 and minimize friction between apparatus 200 and an interior surface of caladria relief duct 102. A plurality of biasing members 213 may also form part of the support structure, the biasing members configured to bias at least one of the rollers into contact with an interior surface of calandria relief duct 102. The biasing members may be a spring, piston, or any types of mechanical actuator suitable to bias rollers radially outward from repair apparatus 200 and into contact with calandria relief duct 102.

Head section 202 may have a drive unit 214 for providing linear motion of apparatus 200 along the length of calandria relief duct 102. Drive unit 214 may include one or more braces 216. As depicted, drive unit 214 includes two brace rings, i.e. a first brace ring 216-1, and a second brace ring 216-2. While the braces, specifically brace rings 216-1 and 216-2, are illustrated as having a circular cross section, the shape of the braces may be varied to suit the environment in which apparatus 200 is used, e.g. the braces may be brace rings having a rectangular shape for insertion in a rectangular tubular structure. Each brace may have a cross section smaller than the cross section of calandria relief duct 102 and can be selectively radially extended to securely engage the tubular structure. In an example, each brace may be expanded to anchor against calandria relief duct 102 or retracted away from the duct 102.

Each brace, e.g. brace rings 216-1, 216-2, is longitudinally movable relative to one another, and/or the tail section 203, by one or more linear actuators 218. In the depicted embodiment, the linear actuators 218 are ball screws driven by electric stepper motors. However, in other embodiments, other types of linear actuators may be used. In another embodiment, linear actuators 218 can be used to define and control the spatial relationship of the planes of each brace disc relative to each other. In an example, at least three linear actuators are used to move adjoining brace rings in relation to each other. The three or more linear actuators may be spaced along the peripheral internal surfaces of the brace rings. Three or more linear actuators allow each of the brace discs to be moved in three dimensions relative to the adjoining disc, e.g. x, y, and z direction shown in FIG. 5. One or two linear actuators may be used to move adjoining brace rings relative to each other; however, one actuator or two actuators do not define a plane and cannot move a brace disc in three dimensions. Due to end-effector weight variations, the natural load posed on the apparatus due to gravity relative to deployed position, mechanical lost motion, and the tolerances of the linear actuators and coupling devices, an apparatus 200 with one or two linear actuators may not be positioned as accurately or effectively within the tubular structure, in comparison to embodiments with three or more linear actuators. Improper placement may impact the anchoring and bracing stability of the apparatus when used for welding, or high reactive force processes such as grinding or mechanical drilling.

Figure 3:
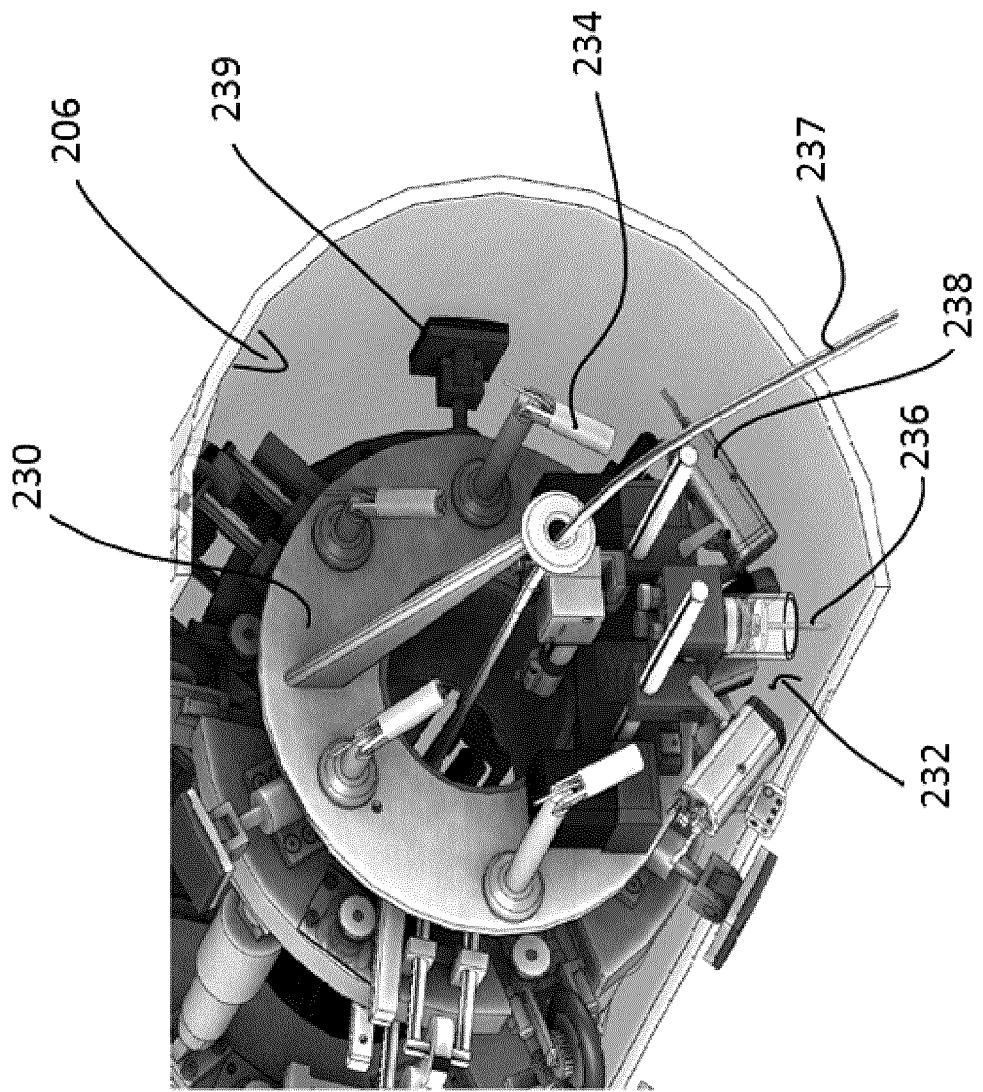
FIG. 3 is an isometric view of an end effector of the repair apparatus of FIG. 2 depicting a base plate, including position sensors, of the repair apparatus.

FIG. 3 depicts end effector 206 in greater detail. End effector 206 has a base plate 230. Base plate 230 is rotatably mounted to head section 202, for rotation about a longitudinal axis of the head section 202. Linear locking actuators 239 are also provided as part of end effector 206, which may be extended in order to create a platform that is fixed in position and is configured to support the dynamic loads of welding or the reactionary load of tasks such as grinding. End effector 206 further includes at least one weld torch 232. In some embodiments, the end effector 206 includes a wire feed unit for feeding a wire electrode 236 through the weld torch for melting and deposition onto the damaged part. End effector 206 further includes a plurality of position sensors 234. Position sensors 234 may be linear variable displacement transformers (LVDTs) and may be operable to report signals indicative of longitudinal and rotational (circumferential) position, and of the radial distance between weld torch 232 and calandria relief duct 102.

In some embodiments, unit 237 can comprise a wire or other component for positioning the tether to allow for torch rotation.

One or more cameras 238 are also mounted to the end effector for remote observation of weld deposition by weld torch 232. Cameras 238 may be fixed relative to plate 230, such that they rotate along with plate 230 and weld torch 232 and maintain a constant position relative to weld torch 232. Cameras 238 may be connected with a remote display device for observation of welds by an operator. Cameras 238 may be equipped with filters, for example, for protection of operator vision or camera sensors from the weld arc.

Figure 4:
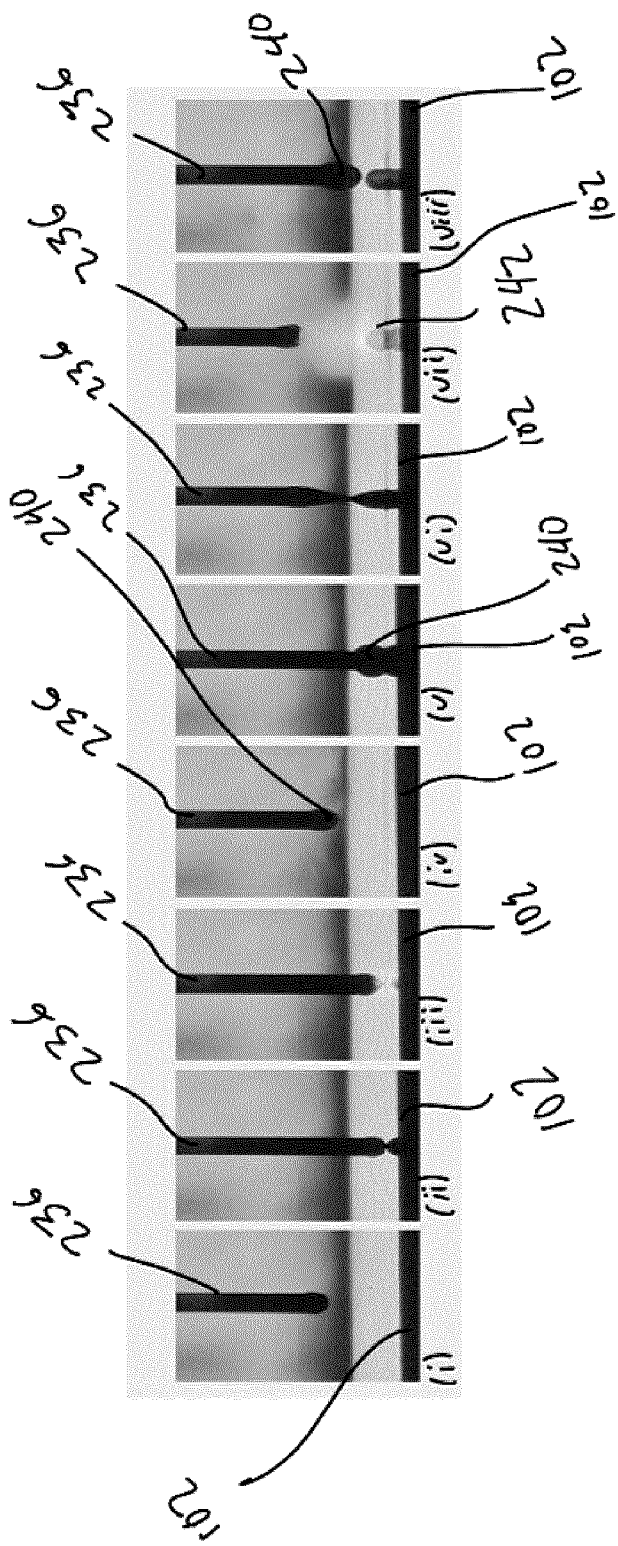
FIG. 4 is a schematic view of stages of a weld deposition process.

Weld torch 232 may be designed to deposit weld material onto a workpiece such as calandria relief duct 102 while limiting the amount of heat introduced into the workpiece. In some embodiments, this may be achieved by modulating voltage and current provided to the wire electrode 236, which may be combined with extension and retraction of the electrode. The deposit weld material may vary depending on the material of the tubular structure being repaired as well as the process conditions the weld material will be exposed to. Typical weld materials for a calandria relief duct may include 304, 304L, 316, or 316L stainless steel. FIG. 4 depicts an example weld deposition process representative of embodiments. As shown in frame (i) and (ii), a consumable wire electrode 236 is extended toward calandria relief duct 102. As the electrode 236 contacts calandria relief duct 102, current to the electrode is increased and an arc initiates. The electrode is then withdrawn out of contact with calandria relief duct 102 and current to the electrode causes formation of a droplet 240 of weld material, as shown in frames (iii)-(iv). At frames (v)-(vi), the electrode 236 is extended into contact with calandria relief duct 102 and then withdrawn, leaving the droplet in a weld pool 242 on the surface (frame (vii)). The droplet detachment and the arc short circuit may occur almost without current as the electrode movement may remove the need for a short circuit to occur because of the electrode wire oscillation. The electrode 236 oscillation detaches the droplet of weld material on the surface of duct 102 as the electrode moves backwards and retracts from the surface. As the electrode 236 is withdrawn, current is increased and a new weld droplet 240 is formed (shown in frame (viii). The placement of weld droplets may be repeated to form a weld (e.g. weld shown in FIG. 7) to remediate a defect in duct 102. This weld technique may be referred to as cold metal transfer (CMT). In an example, CMT may have a feedrate capability of 40 inch/minute.

Overhead welding may also be achieved according to the embodiment described above with reference to FIG. 4. As described in relation to frames (v)-(vi), the electrode is extended into contact with calandria relief duct 102 and then withdrawn. In overhead welding, extension of electrode 236 into contact with calandria relief duct 102 will need to occur quickly to deliver droplet 240 from electrode 236 to form weld pool 242 to avoid premature solidification of weld material which may create conical peaks of weld material upon solidification.

Variations of the weld deposition process shown in FIG. 4 are possible. In an embodiment, instead of the electrode 236 extending into contact with relief duct 102 (as shown in frame (v)) to deposit the weld material directly on the surface of duct 102, the electrode droplet 240 may be allowed to fall to the surface of duct 102. Because the droplet falls to the duct, an electrical short circuit is not created between wire electrode 236 and duct 102, which minimizes the heat stress imparted to the duct. In another embodiment, after the droplet forms on electrode 236, the electrode 236 may be drawn away from the surface of duct 102 to cause the droplet 240 to fall to the surface of calandria relief duct 102. The motion of retracting the electrode 236 away from the duct 102 pulls droplet 240 off electrode 236 and causes it to fall to duct 102. In another embodiment, electrode 236 is not retracted from the duct 102 after droplet 240 is formed, and the droplet 240 is deposited on calandria relief duct 102 by contact between the droplet 240 and duct 102.

It has been determined that in embodiments, deposition of a weld using the technique described above has been found to structurally mitigate defect 104, while limiting heat introduced to calandria relief duct 102 to acceptable levels. That is, it has been found that heat introduced does not create unacceptably high risk of causing further damage to relatively thin-walled structures such as calandria relief duct 102 that have been subjected to radiation hardening.

In comparison to other welding techniques, CMT may provide droplets of weld material to the weld pool at a cooler temperature that minimizes heat stresses imparted to the metal substrate (e.g. a calandria relief duct). However, other types of weld techniques may be used as part of the apparatus and method described herein. For example, in certain circumstances GMAW may be an desirable welding technique of which there are many variants such as: Gas Metal Arc Welding GMAW; Globular GMAW; Short-circuiting/Short-arc GMAW (Drip Transfer); Spray & Spray Pulsed GMAW.

GMAW is a welding process in which an electric arc forms between a consumable wire electrode and the work piece metal(s), which heats the work piece metal(s), causing them to melt and join. A constant voltage, direct current power source is most commonly used with GMAW. However, pulsing current GMAW, such as Spray & Spray Pulsed GMAW, may also be used to melt the filler wire and allow a small molten droplet to fall with each pulse. Pulses allow the average current to be lower, decreasing the overall heat input and thereby decreasing the size of the weld pool and heat-affected zone while making it possible to weld thin work pieces. The pulses of current may provide a stable arc with no spatter, since short-circuiting may not take place.

In another example, welding techniques other than GMAW may be used. For example, thermal spray processes such as Plasma Transferred Arc Welding (PTAW) may also be used as a welding technique in which at least one weld torch 232 may create a high-energy arc between an anode and cathode on torch 232, and calandria relief duct 102. Inert gas, e.g. argon, may be supplied to the arc to create a plasma column then a powder metal consumable is introduced into the plasma column, using the plasma as both a heat source to melt the powder, and a propelling agent to spray (atomized) and coat the substrate creating metallurgical bond (cladding) to the substrate.

In some embodiments, Gas Tungsten Arc Welding (GTAW) may be used.

Figure 5:
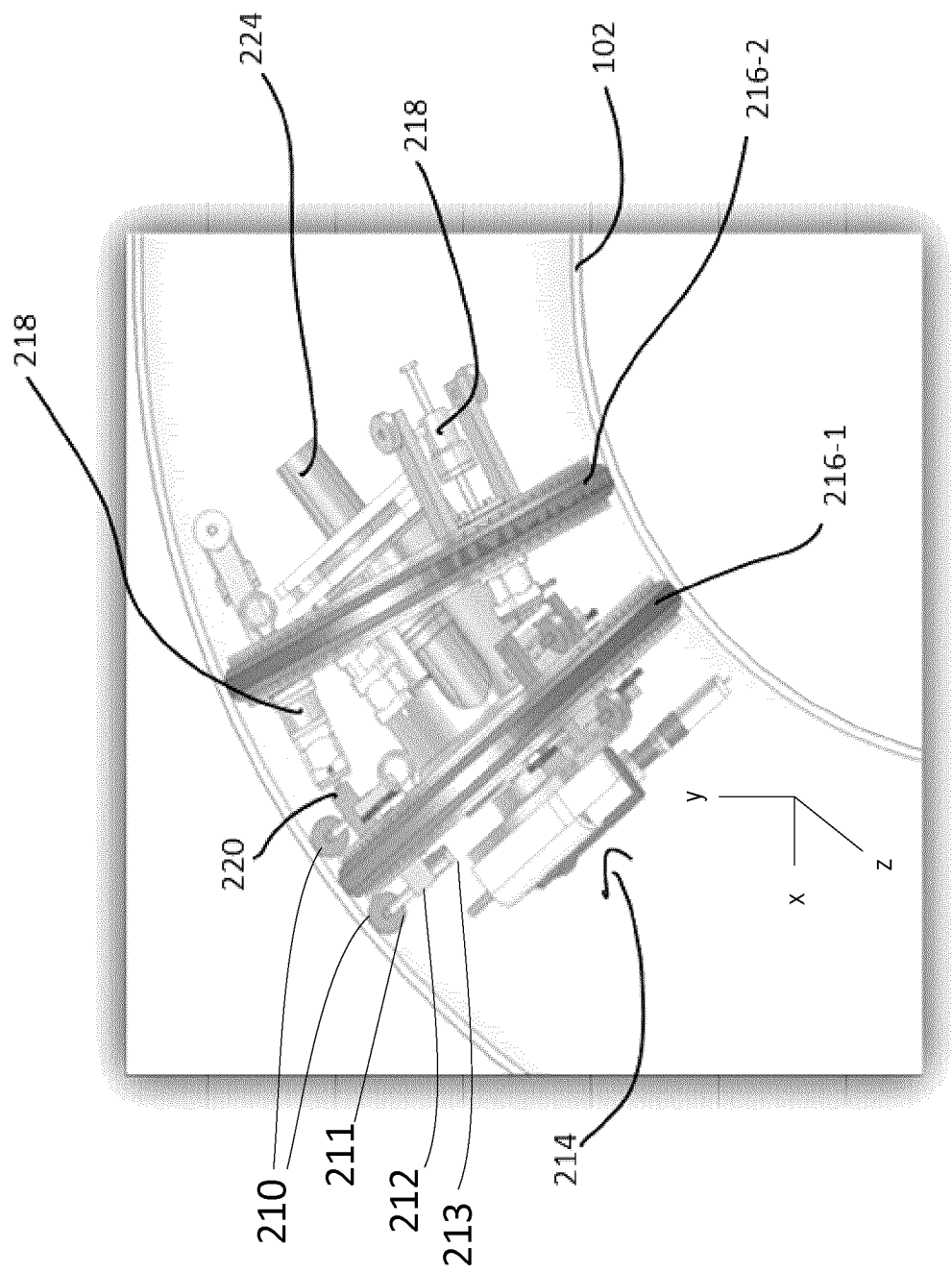
FIG. 5 is an overhead view of a drive unit of the repair apparatus of FIG. 2.
Figure 6:
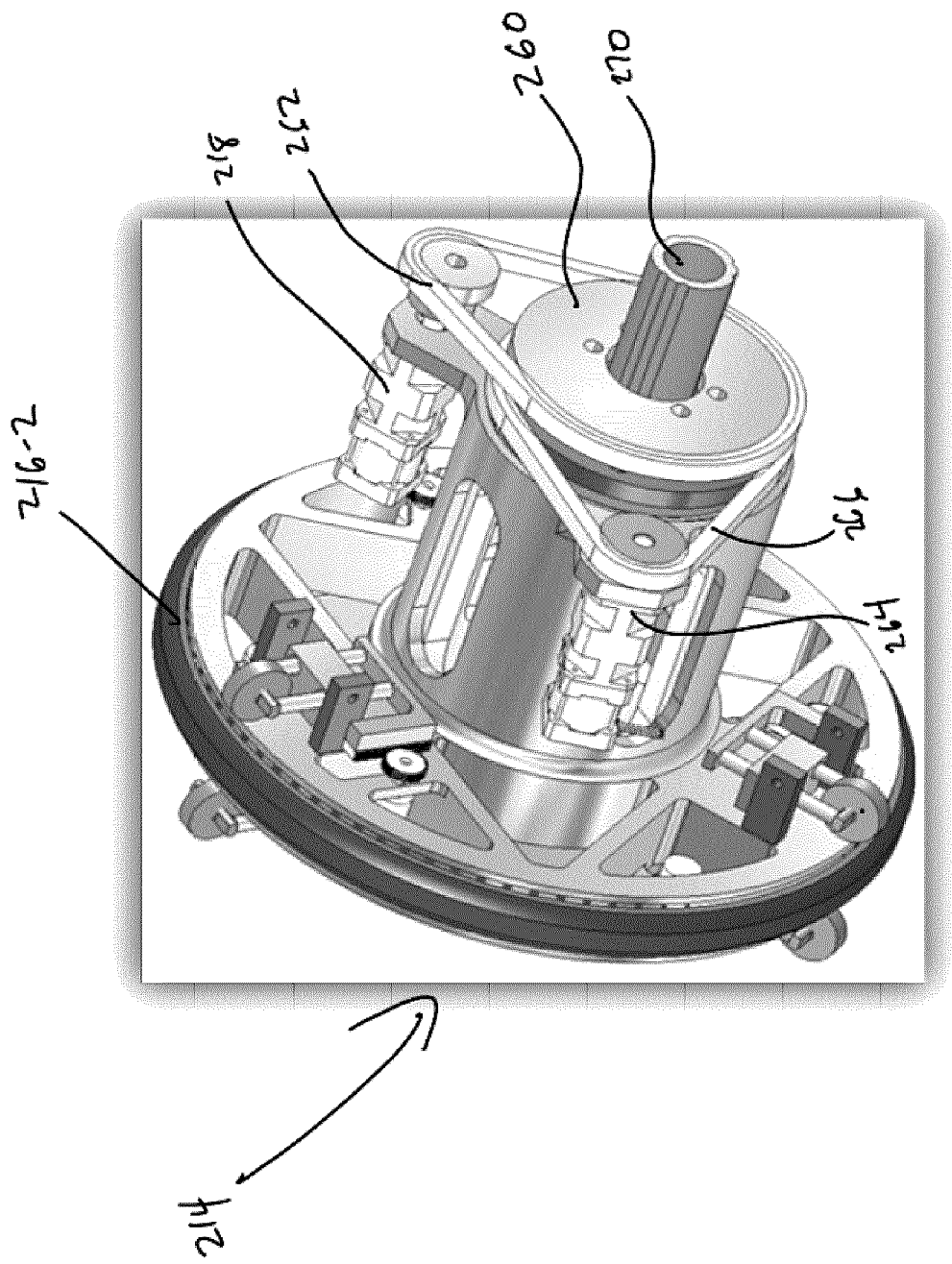
FIG. 6 is a perspective view of a portion of the drive unit of FIG. 5.

FIGS. 5-6 depict drive unit 214 in greater detail. Linear actuators 218 are powered and controlled by lines routed through tail section 204 (FIG. 2). Extension of linear actuators 218 pushes brace rings 216-1, 216-2 farther apart. Conversely, retraction of linear actuators 218 draws brace rings 216-1, 216-2 closer together. Linear actuators 218 are mounted to brace rings 216 at hinged connections 220, such that brace rings 216 are free to pivot relative to linear actuators 218.

Linear actuators 218 are operable to precisely control the positions of bracing rings 216 relative to one another. As noted, in the depicted embodiment, linear actuators 218 are driven by stepper motors, such that extension occurs in discrete increments. In an embodiment, three linear actuators are arranged to connect to points 120 degrees apart on brace rings 216-1 and/or 216-2. One end of each linear actuator may be connected to a bracing rings and supported on bearings and the other end may be connected to an adjacent bracing rings and supported by a sleeve on a nut with swivel/rotary pins.

Drive unit 214 is operable to move repair apparatus 200 by sequentially extending one of brace rings 216 to anchor against calandria relief duct 102, then moving the other brace rings 216 relative to the anchored brace ring 216, anchoring the moved ring in its new location, and moving the other ring. For example, in the depicted embodiment, apparatus 200 may be moved in the distal direction by expanding the proximal brace ring 216-2 and retracting distal brace ring 216-1; extending linear actuators 218; expanding the distal brace ring 216-1 to anchor against calandria relief duct 102 and retracting proximal brace ring 216-2; and retracting linear actuators 218. The brace rings 216 also support the repair apparatus 200 during welding. Brace rings 216 may have inflatable seals (e.g. pneumatically inflatable seals) which may be expanded to extend into contact with the tubular structure, i.e. calandria relief duct 102, to anchor repair apparatus 200. Brace rings 216 may extend transverse to longitudinal axis of tubular structure such that it contacts the cross sectional circumference of the tubular structure to maximize the surface contact area between brace rings 216 and the tubular structure. The position of head section 202 (and in particular, end effector 206), may be tracked, e.g., based on an encoder signal received from the stepper motors.

In an embodiment, a first brace (e.g. brace ring 216-2) may be positioned at a first angle with respect to an interior surface of a tubular structure (e.g. calandria relief duct 102). The first angle may be generally transverse to the longitudinal axis of the tubular structure, e.g. as shown in FIG. 5 brace rings 216-1 and 216-2 are generally transverse to longitudinal axis of calandria relief duct 102, or at an angle with respect to the plane transverse to the longitudinal axis of the tubular structure. The tubular structure may then be securely engaged by the first brace. For example, the first brace may extend into contact with an inner surface of the tubular structure, or the first brace may be expanded (e.g. by pneumatics) to sealingly engage the inner surface of the tubular structure, such that the first brace securely engages the tubular structure to provide an anchor against which the apparatus can be moved in relation to. At least one linear actuator may then be expanded or contracted to move the repair apparatus 200 relative to the first brace and advance apparatus 200 in a direction (e.g. the proximate or distill directions) within the tubular structure. Expansion or contraction of the at least one linear actuator may advance the repair apparatus depending on the configuration of the linear actuators. For example, a linear actuator on the distil side of the first brace that is expanded may push the repair apparatus in the distil direction; whereas, a linear actuator on the proximal side of the first brace that is contracted may pull the repair apparatus in the distil direction. As the at least one linear actuator expands or contacts, the repair apparatus advances generally along the longitudinal axis of the tubular structure. The repair apparatus may move in straight sections of the tubular structure as well as movement through tubular elbows (e.g. 45 and 90 degree, short and long radius elbows). A body of the repair apparatus, e.g. tail section 204, may be connected to the first brace, for example by tether 224, and advanced as the at least one linear actuator is actuated. The body of the repair apparatus may comprise roller structures 210 to reduce friction between the body and the surface of the tubular structure as repair apparatus 200 advances through the tubular structure.

In an embodiment, moving the repair apparatus relative to the securely engaged first brace includes moving a second brace relative to the first brace. The second brace may be positioned at a second angle with respect to the interior surface of the tubular structure by expanding or contracting at least one linear actuator to advance the repair apparatus. The second angle may be generally transverse to the longitudinal axis of the tubular structure or at an angle with respect to the plane transverse to the longitudinal axis of the tubular structure. As noted above, in an embodiment, at least three linear actuators may be configured to move the first and second braces relative to one another for positioning a plane of each brace at a desired spatial relationship relative to each other.

Continuing the above example, as shown in FIG. 5, a first brace, e.g. brace ring 216-2, may be anchored to the tubular structure and linear actuators 218 may move the second brace relative to anchored first brace to advance repair apparatus 200 within the tubular structure. Tether 224 may be connected to the second brace, e.g. brace ring 216-1, and advance within the tubular structure as linear actuators 218 expand and push against the anchored first brace. The second brace, e.g. brace ring 216-1, may be securely engaged to the inner surface of the tubular structure. The first brace may then be disengaged from the tubular structure and repositioned with respect to the tubular structure and the second brace to engage the tubular structure once more to move the repair apparatus within the tubular structure as described above. When repair apparatus 200 has reached a defect location, the first and second braces may each securely engage the tubular structure to fix the position of the repair apparatus 200 with respect to the tubular structure. A locking actuator 239 may also extend into contact with the tubular structure to fix the longitudinal position of the repair apparatus with respect to the tubular structure. The weld torch may then be positioned by rotating a base plate of the repair apparatus 200 to position the weld torch into circumferential alignment with a weld location. Welding may then commence according to a desired welding technique, e.g. CMT welding.

To position brace rings 216 at a desired angle with respect to the tubular structure, or position weld torch and/or plate 230 at a desired angle with respect to the tubular structure during welding (e.g. perpendicular to the tangent of duct 102), position sensors 234 may provide input to controllers for the stepper motor controllers In an example, each brace ring 216 may have a plurality of pairs of linear displacement devices. For example, each brace ring 216 may have a six linear displacement measurement devices. The devices may be arranged in pairs, with one of each pair located on opposite sides of the plate 230 or brace ring 216. During (axial) motion the angular position of each brace disc or plate 230 may be monitored to insure that all three pairs of linear displacement sensors remain at equally spaced distances to the sensor on the opposite side of the disk. When the sensor pairs are equally displaced the disk has reached a position by which it is perpendicular to the inside surface of the duct. Once the brace rings 216, and consequently the end-effector are in the desired position, linear locking actuators 239 may be extended in order to create a platform that is fixed in position and is capable of supporting the dynamic loads of welding or the reactionary load of tasks such as grinding.

Movement of apparatus 200 may create tension in apparatus 200 while drive unit 214 advances head section 202. In particular, tail section 204 and rollers structures 210 drag against calandria relief duct 102 and therefore resist movement due to operation of drive unit 214. Tension in tether 224 may aid in achieving accurate position control of head section 202 and end effector 206.

FIG. 6 is an isometric view of drive unit 214 and brace ring 216-2. As depicted, drive unit 214 has an electric motor 260, which may be a stepper motor. Motor 260 drives linear actuators 218 by way of a first chain drive 262. Specifically, motor 260 turns a ball screw, causing extension of linear actuators 218 in a first direction of rotation, or retraction in a second direction of rotation.

Motor 260 further drives one or more rotational actuators 264 by way of a second chain drive 266. Rotational actuators 264 are coupled to end effector 206 for rotating the end effector to position weld head 232 circumferentially.

In combination with rotational actuators 264 and linear actuators 218 of drive unit 214, weld torch 232 is operable to deposit a layer of weld material onto a work piece, e.g. calandria relief duct 102 by forming droplets of weld material and causing the droplets to fall onto the work piece.

Figure 7:
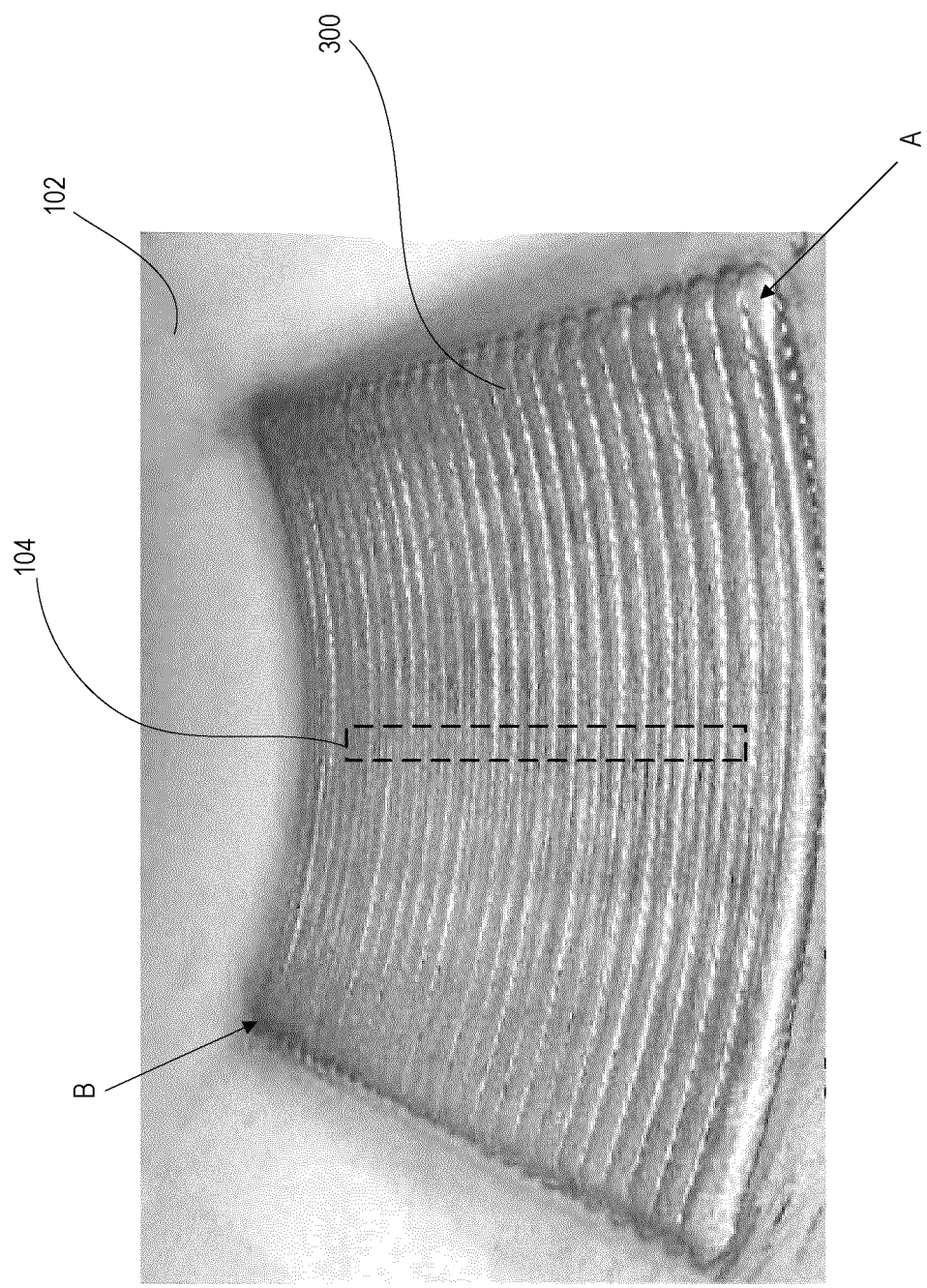
FIG. 7 depicts a weld layer deposited on a calandria relief duct of the reactor of FIG. 1.

FIG. 7 depicts an example weld 300 formed on calandria relief duct 102 using apparatus 200. The location of defect 104 is indicated in broken line. Weld 300 is deposited as a series of droplets, as described above with reference to FIG. 4. During deposition of weld 300, drive unit 214 is operated by a controller to define the longitudinal and radial extent of weld 300. That is, plate 230 of end effector 206 is rotated to deposit a circumferentially-extending bead of weld. End effector 206 is extended or retracted by linear actuators 218 to deposit longitudinally-extending weld.

As depicted, weld 300 covers an area of calandria relief duct 102 surrounding defect 104 and structurally bridges the defect. That is; weld 300 structurally joins non-defective metal on both sides of defect 104.

In some embodiments, it may be desired to deposit additional weld material atop weld 300 for further structural reinforcement. Conveniently, the structurally-sound weld 300 may be capable of withstanding further heat input without further damage to the work piece. In other words, weld 300 may effectively act as a heat sink for further repair procedures. Thus, in some embodiments, additional weld material may be deposited by conventional welding techniques such as gas metal arc welding (GMAW). Weld 300 may therefore be referred to as a protective weld layer. Subsequent layers may be referred to as reinforcing layers.

End effector 206 also allows for preliminary examination of weld 300. Specifically, cameras 238 (FIG. 3) are oriented and focused to capture images of electrode 236 during and subsequent to depositing of weld 300. Optionally, cameras 238 may be equipped with optical filters (not shown), for example, to protect the eyes of a viewer or the camera sensor, or to aid in the assessment of weld integrity.

Figure 8:
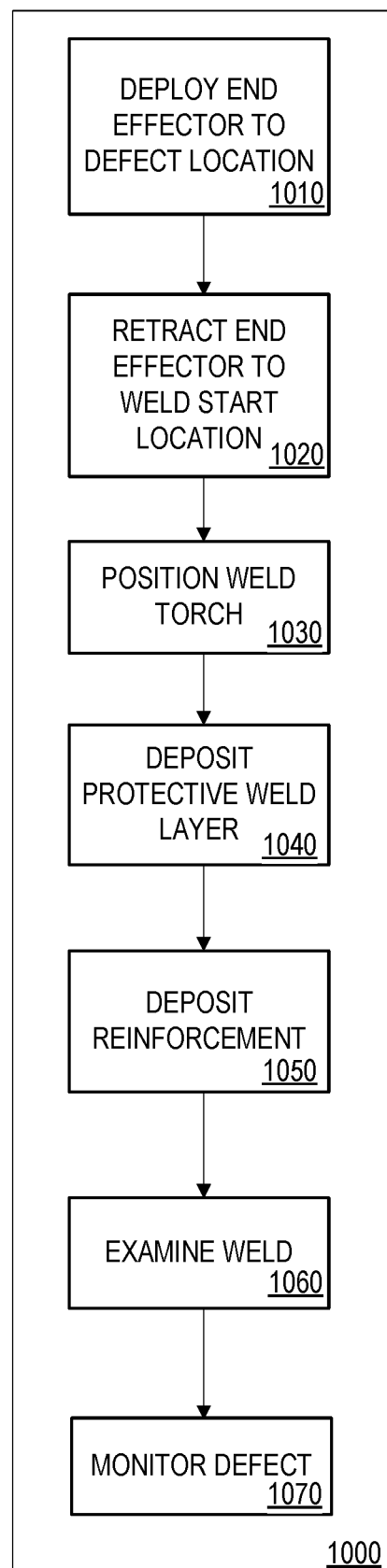
FIG. 8 is a flow chart depicting a process for repairing a defect.
Figure 9:
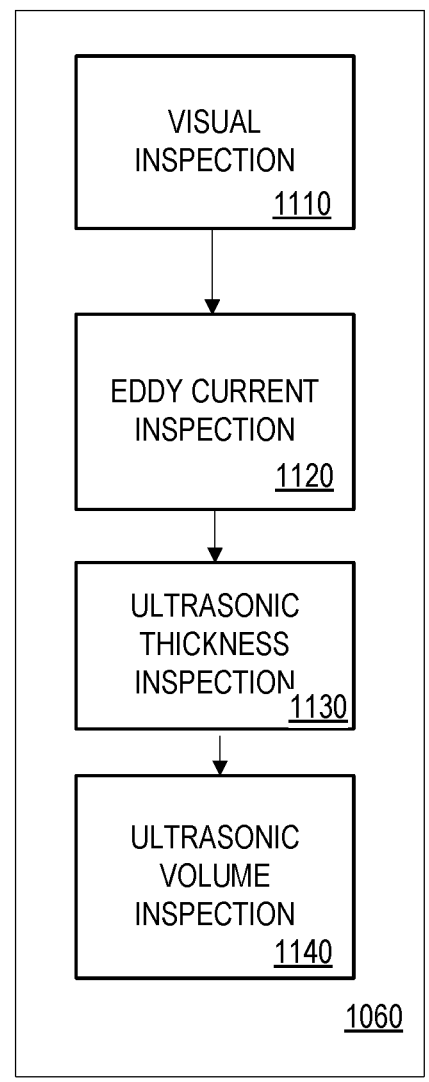
FIG. 9 is a flow chart depicting a process for examining a weld.

FIG. 8 is a flow chart depicting of an example process 1000 for repairing a defect. At block 1010, end effector 206 is deployed to the location of defect 104 using drive unit 214. Repair apparatus 200 is inserted in calandria relief duct 102 with head section 202, including end effector 206, at the distal end. Drive unit 214 moves repair apparatus 200 towards the defect location using sequential extension and anchoring of each of brace ring 216-1 and 216-2 and movement of the other brace ring relative to the anchored brace ring. Position of repair apparatus 200, end effector 206 is tracked by position sensors 234 and reported to a controller. In an example, drive unit moves repair apparatus 200 to a location slightly distal of defect 104. In other words, drive unit 214 may advance repair apparatus 200 until it slightly overshoots the location of defect 104, preferably by less than a stroke length of linear actuators 218.

At block 1020, end effector 206 is retracted to a weld start location, indicated as point A in FIG. 7. Specifically, linear actuators 218 of drive unit 214 retract end effector 206 to align weld torch 232 to a weld start location. In some embodiments, the weld start location may be at an end point of the defect or at a specified location relative to an end point of the defect. Preferably, end effector 206 is retracted by less than a stroke length of linear actuators 218. Thus, retraction may be performed by anchoring brace ring 216-2 against calandria tube duct 102 and operating linear actuator 218 to draw brace ring 216-1 toward brace ring 216-2. Linear locking actuators 239 may also be extended into contact with an interior surface of calandria relief duct 102 to fix the position of end effector 206 with respect to the defect.

At block 1030, weld torch 232 is positioned in relation to the defect location. Base plate 230 of the end effector 206 is rotated around a longitudinal axis of the head section 202 until weld head 232 is circumferentially aligned at a weld start location. Alignment may be determined based on signals received from one or more position sensors 234. Alignment may be perpendicular to the tangent of tubular structure surface at the weld location or at an angle with respect to the surface of the weld location.

At 1040, a protective weld layer is deposited. Weld head 232 may deposit weld material onto a workpiece by cold metal transfer as described above with reference to FIG. 4. That is, weld droplets are sequentially formed and released to drop onto the workpiece, namely, calandria relief duct 102. As noted, the CMT welding technique limits the heat introduced into the workpiece, which may help maintain the integrity of the material. For example, this technique may reduce the likelihood of crack formation or propagation, especially in irradiated or thin components. In other embodiments, other types of welding techniques may be utilized to deposit weld material to a workpiece , e.g. PTAW. In some embodiments, weld torch 232 is moved in a path to deposit weld material over the entirety of the defect and a portion of the surrounding area of the workpiece. For example, weld material may be distributed circumferentially by rotating base plate 230 about a longitudinal axis of the head section 202 while weld torch 232 deposits weld material. Weld material may be distributed longitudinally by movement (e.g. retraction) of linear actuators 218 to move end effector 206 and weld torch. For example, at the end of a circumferentially-extending weld bead, drive unit 214 may move end effector towards the proximal end of the workpiece, such that an adjacent bead may be deposited. Depositing of a protective weld layer may continue in this manner until the weld reaches a weld end location, indicated as point B in FIG. 7. As depicted, the completed weld layer covers the defect and overlaps to the surrounding metal by a defined margin. Thus, the protective weld layer may structurally bridge the defect. In other words, the weld may extend between regions of sound metal surrounding the defect.

At 1050, a reinforcement weld layer may be deposited on top of the protective weld layer, for example, where multiple weld layers are desirable for increased structural integrity.

The reinforcement weld layer can be deposited by repair apparatus 200 using a cold metal transfer process as described herein to further minimize introduction of heat into the workpiece. In some embodiments, the reinforcement weld layer may instead be deposited using a different, e.g. conventional, welding process such as gas metal arc welding (GMAW). The protective weld layer can form a barrier between the workpiece and subsequent engagement with a weld head, electrode, weld, weld pool, or other component involved in a welding process, such that the protective layer absorbs heat rather than or in addition to the workpiece. This protective weld layer can therefore allow repair apparatus 200 or a cold metal transfer process described herein to be used with other welding apparatuses or welding processes to repair irradiated metal, for example.

One or more reinforcement weld layers can be sequentially deposited onto a previously deposited weld layer. For example, multiple reinforcement weld layers may be employed to effect a repair to a workpiece. In some embodiments, each reinforcement weld layer may be deposited according to one or more different patterns designed to improve structural integrity or effect a repair.

In another example, a through wall breach may have occurred and the primary requirement will be to stop the through wall leak path. Rebuilding the wall where a through wall breach exists may be performed by apparatus 200 tack welding a base plate or plug in place, and then welding an initial build-up layer over the around and over the plate or plug. Additional, reinforcement weld layers may continue to be added to build up the weld as described above.

At 1060, the weld is examined, for example, according to one or more processes according to various regulatory standards. The protective weld layer and/or one or more reinforcement weld layers At 1070, the defect is monitored after completion of the repair to verify that further growth of defect 104 does not occur.

FIG. 11 is a flow chart depicting an example process for examining a weld at block 1020. The depicted process of examining the weld may confirm structural integrity of the weld or of surrounding areas of the workpiece, and suitability of the repaired component for being returned to service in the reactor. Successive examination can be performed according to a schedule, for example, at every outage (e.g., when the workpiece is not in use), until the defect is removed.

At 1110, visual inspection is performed on the weld, including one or more protective and/or reinforcement weld layers, and surrounding areas of the workpiece. For example, surface examination can be performed using artificial lighting. The weld crown can be examined with no surface preparation. Visual inspection may be performed using cameras 238 during or immediately following depositing of the weld.

At 1120, an eddy current examination is performed on the weld, including one or more protective and/or reinforcement weld layers, and surrounding areas of the workpiece, for example, to detect flaws in the material. The weld crown can be examined with no surface preparation.

At 1130, weld build-up thickness, including one or more protective and/or reinforcement weld layers, is measured by ultrasonic methods.

At 1140, ultrasonic volume inspection is performed on the weld, including one or more protective and/or reinforcement weld layers, and surrounding areas of the workpiece. For example, ultrasonic angle beam examination can be used to validate the integrity of the weld deposit. The weld crown can be examined with no surface preparation in some embodiments.

Although the above examples are described with reference to repair of a calandria relief duct, apparatus and methods disclosed herein may be applicable to performing repairs on other reactor components. In particular, such methods and apparatus may be useful for repairing irradiated and thin-walled components.

Similarly, repair apparatus 200 may be useful for deploying end effector 206 within tubular structures other than calandria relief ducts.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method of in-situ repairing a defect in a tubular structure, comprising:
    extending a locking actuator to contact said tubular structure and anchor said locking actuator to fix the position of an end effector with respect to the tubular structure, said end effector comprising a wire electrode;
    forming a droplet of weld material on the wire electrode;
    oscillating the wire electrode to detach the droplet of weld material as the electrode retracts from the tubular structure; and
    depositing a protective weld layer over the defect by sequentially depositing each droplet of weld material detached from the oscillating wire electrode atop a weld pool on said structure,
    wherein said protective weld layer bonds to said structure surrounding said defect to structurally join non-defective metal on both sides of said defect and covers said defect and overlaps to said structure surrounding said defect by a defined margin,
    wherein sequentially depositing weld droplets comprises selectively moving a wire electrode of a weld torch between a retracted position in which the weld droplet is formed, and an advanced position in which the weld droplet is deposited on the structure, and
    wherein sequentially depositing weld droplets comprises depositing each droplet of weld material adjacent a previously deposited droplet to form the protective weld layer and moving the wire electrode in a path to deposit weld material over the entirety of said defect and a portion of said structure surrounding said defect.

2. The method of claim 1, wherein the weld droplet is dropped on the structure.

3. The method of claim 1, wherein depositing the protective weld layer over the defect is by gas metal arc welding (GMAW) or Gas Tungsten Arc Welding (GTAW) or Plasma Transferred Arc Welding (PTAW).

4. The method of claim 1, comprising inserting a repair apparatus into the tubular structure;
and moving the repair apparatus to a location of the defect.

5. The method of claim 1, comprising depositing a reinforcing layer atop said protective weld layer by gas metal arc welding (GMAW) or Gas Tungsten Arc Welding (GTAW) or Plasma Transferred Arc Welding (PTAW);
wherein said protective weld layer forms a barrier between the workpiece and subsequent engagement with a weld head, the wire electrode, a weld, a weld pool, or a welding process component such that the protective layer absorbs heat rather than or in addition to the workpiece.

6. An apparatus for repairing a defect in a tubular structure, comprising:
a body for insertion in said tubular structure;
an end effector mounted to said body, said end effector having a weld torch operable to deposit weld material on said tubular structure by forming molten weld droplets and depositing said weld droplets onto said tubular structure;
an extendable locking actuator for selectively contacting said tubular structure and anchor said locking actuator to fix the position of said end effector with respect to the tubular structure; and
a drive unit comprising:
a first brace for selectively securely engaging the tubular structure to anchor the apparatus;
at least one linear actuator for moving said apparatus relative to said first brace in a direction along the longitudinal axis of the tubular structure; and
a rotational actuator coupled to said end effector for rotating said weld torch.

7. The apparatus of claim 6, wherein the drive unit comprises a second brace for selectively securely engaging said tubular structure, the at least one linear actuator configured to move said first and second braces relative to one another in the longitudinal direction to move said apparatus in the direction.

8. The apparatus of claim 7, wherein the rings braces have a cross section smaller than a cross section of the tubular structure.

9. The apparatus of claim 7, wherein the drive unit comprises at least three linear actuators configured to move said first and second braces relative to one another for positioning a plane of each brace at a desired spatial relationship relative to each other.

10. The apparatus of claim 6, comprising a wire feed unit configured to selectively advance and retract a wire electrode of said weld torch.

11. The apparatus of claim 10, wherein said weld torch is configured to deposit said weld droplets onto said tubular structure by causing said weld droplets to fall by retracting said wire electrode away from said tubular structure.

12. The apparatus of claim 10, wherein said weld torch is configured to advance toward said tubular structure to deposit weld droplets on said tubular structure.

13. The apparatus of claim 6 comprising a plurality of rollers structures connected to the end effector or the body, the roller structures comprising:
a support structure;
rollers rotatably connected to the support structure; and
a plurality of biasing members each configured to bias at least one of the rollers into contact with the tubular structure.

14. The apparatus of claim 6, comprising position sensors operable to report signals indicative of longitudinal and rotational position of the end effector and weld torch, and of the radial distance between weld torch and tubular structure.

15. A method of repairing a defect in a tubular structure, comprising:
inserting an apparatus in said tubular structure, said apparatus comprising a body, an end effector mounted to said body comprising a wire electrode, said end effector having a weld torch operable to deposit weld material on said tubular structure by forming molten weld droplets and depositing said weld droplets onto said tubular structure, and an extendable locking actuator for selectively contacting said tubular structure and anchor said locking actuator to fix the position of said end effector with respect to the tubular structure;
selectively contacting said tubular structure and anchoring said extendable locking actuator to fix the position of said end effector with respect to the tubular structure;
forming a molten droplet of weld material on said wire electrode;
oscillating said wire electrode to detach said droplet of weld material as the electrode retracts from the tubular structure; and
depositing said weld droplet onto said tubular structure.

* * * * *